Sept. 20, 1960    G. J. TOPOL ET AL    2,953,249
FILTER AND DEHYDRATOR
Filed March 1, 1955    2 Sheets-Sheet 1

INVENTORS.
GEORGE J. TOPOL &
LESLIE B. BARANOWSKI
BY
Albert L. Jeffers
ATTORNEY

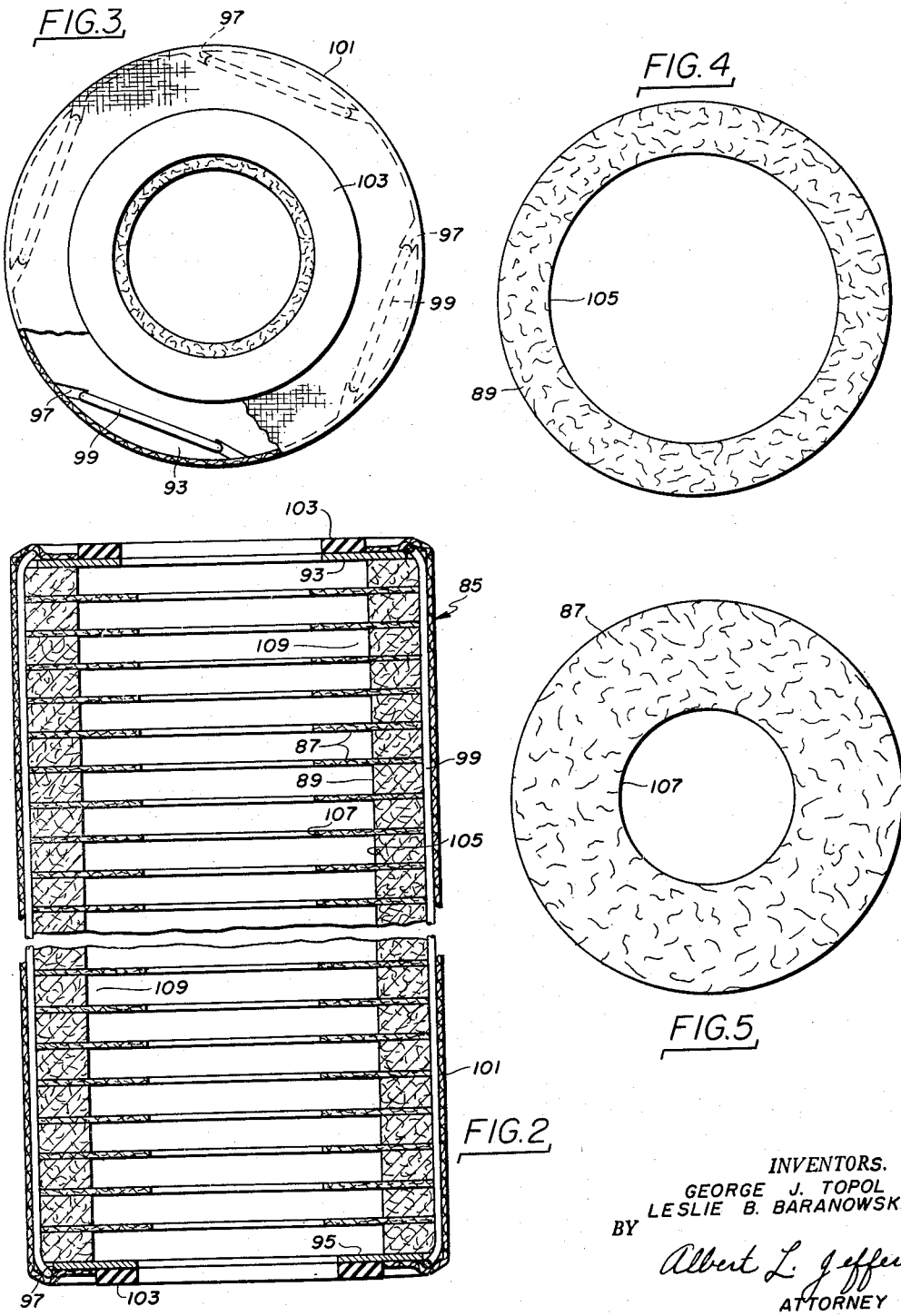

2,953,249
Patented Sept. 20, 1960

2,953,249
FILTER AND DEHYDRATOR

George J. Topol, Hamilton, Ontario, and Leslie B. Baranowski, Burlington, Ontario, Canada, assignors to Bowser, Inc., Fort Wayne, Ind., a corporation of Indiana Filed Mar. 1, 1955, Ser. No. 491,434

1 Claim. (Cl. 210—305)

This invention relates to a filter and separator for liquids, especially emulsified liquids, and is particularly adapted for removing contaminant and water from a water in oil emulsion which may be present in such liquid as JP-4 jet fuel, gasoline, fuel oil, diesel fuel, kerosene and other similar products.

It is an object of the invention to provide a cartridge which has a high dirt holding capacity and which can be readily replaced by a new cartridge when the original cartridge becomes fouled or otherwise rendered inoperative.

Another object of the invention is the provision of a cartridge which would efficiently handle liquids under high flow rate.

A further object of the invention is to provide a cartridge with pockets for increasing the surface filtration area and for storing large quantities of contaminants.

A salient object of the invention is the provision of a cartridge which occupies approximately 53 percent of the cross sectional area and is capable of handling substantially double the capacity of flow as compared to prior art cartridges.

Yet another object of the invention is to provide a cartridge of rigid design to obtain higher breakdown pressure differential.

Still another object of the invention is to provide a cartridge constructed with discs of different diameter which form pockets to increase the filtration cycle.

Another object of the invention is to provide a filter-dehydrator cartridge which is made of glass fibers which are compressed to a predetermined density and bonded together to maintain the predetermined density.

With the foregoing objects in view, together with such other objects and advantages as may subsequently appear, the invention resides in the parts and in the combination, construction and arrangements of parts hereinafter described and claimed, and illustrated by way of example in the accompanying drawing, in which:

Figure 2 is a vertical sectional view of the cartridge;

Figure 3 is a plan view of the cartridge illustrated in Figure 2;

Figure 4 is a plan view of a glass fiber spacing disc;

Figure 5 is a plan view of a glass fiber filtering disc.

Figure 1:
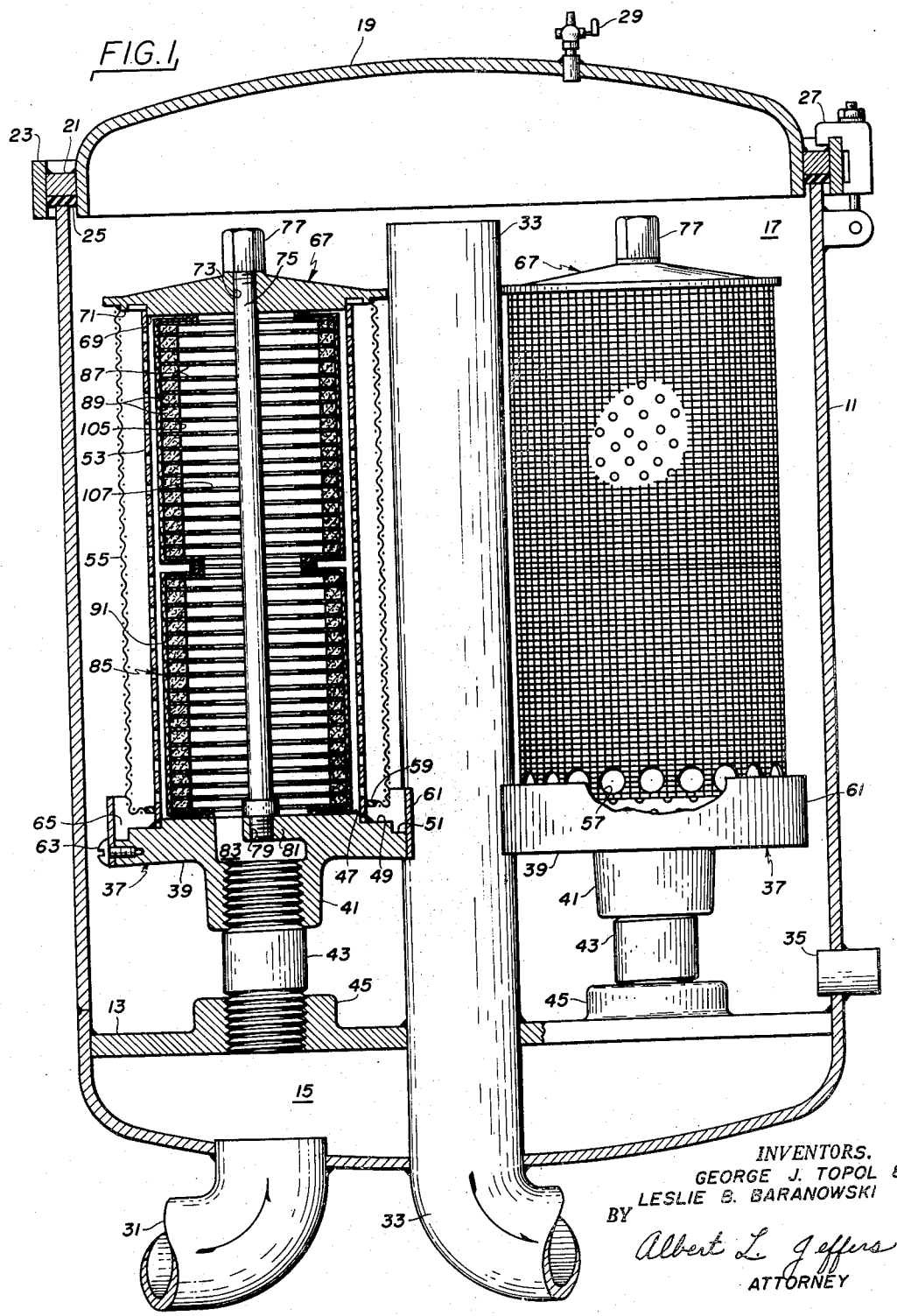
Figure 1 is a vertical sectional view of a filter-dehydrator with parts in section showing the cartridges mounted therein and the preferred disposition of the fluid connections.

Referring to the drawings, particularly Figure 1, the numeral 11 designates a tank provided with a deck plate 13 which extends across the lower end to form an inlet chamber or compartment 15 and an effluent chamber or compartment 17. The tank is provided with a removable cover 19 which includes a radial flange 21 and a vertical flange 23. A gasket 25 is disposed between the radial flange and the tank to provide a seal. The tank is provided with clamping means 27 to engage over the vertical flange 23 for securing the cover to the tank. A vent 29 is provided in cover 19.

The inlet conduit 31 is connected at one end to the inlet chamber 15 and at the other end with a pump or other source of fuel under pressure (not shown). The outlet conduit 33 extends vertically through the bottom of the tank, the deck plate and terminates adjacent the upper end of the chamber 17. A drain tube 35 is disposed in the tank above the deck plate and communicates with the lower portion of the chamber 17.

The separating unit 37 includes a bottom head 39 provided with a threaded boss 41 for receiving one end of a threaded nipple 43. The deck plate is provided with a threaded boss 45 for receiving the other end of the threaded nipple 43. The bottom head is provided with a series of concentric circular bosses 47, 49 and 51 on its upper face.

A perforated, metal cake or canister 53 is arranged over the boss 47 while a cylinder of screen wire 55 provided with openings 57 is disposed around the cage and spaced therefrom by an inturned flange 59 which prevents deformation of the screen and maintains a constant distance between the screen and the cage 53. A weir 61 is attached to the periphery of the head by screws 63 to form a water trap 65 which causes the water separated from the fuel to flow in a stream rather than in drops and the danger of water entering the effluent stream is completely eliminated.

The upper head 67 is provided with a concentric circular boss 69 adapted to engage a portion of the inner periphery of the cage 53 and a down turned flange 71 for attachment of the wire screen 55.

An opening or hole 73 is formed in the upper head 67 to receive the rod 75 which is threaded at both ends. A nut 77 is mounted on the upper end of the rod to seal the hole 73 while the lower end of the rod is screwed into a tapped hole 79 in the web 81. Ports or openings 83 are formed in the lower head so that liquid rising in the nipple 43 will enter the interior of the cartridge 85.

The cartridge 85 is made of fiber glass discs 87 and 89 of two different sizes alternately arranged. The fiber glass is preferably bonded with a resin such as a phenol formaldehyde, thermosetting resin and compressed during curing of the resin so that the fiber glass is held in the compressed or predensified state by the polymerized resin.

The fiber glass material may be made in a variety of densities, however, we prefer to utilize an eight pound density. That is, the weight of material which has been compressed to a cubic foot volume is eight pounds.

While the cartridges may be made in different lengths, we prefer to stack the discs freely and alternately on a mandrel to a free length of approximately 24 inches and to obtain rigidity the discs are compressed to approximately 16 inches to form a single element 91. The element is held in its precompressed form by end caps 93 (Fig. 2) and 95 provided with slots 97 for receiving a band 99 of soft wire. When assembled between the heads 37 and 67 the cartridge is compressed approximately an additional one-half inch by the bolt 75 and a seal between the gasket 103 and heads is thus assured.

A sleeve or stocking 101 of cotton, knit tubing which is of ribbed construction for yieldability, is pulled over the assembled sections and the ends of the sleeve are bent over the end surfaces of the caps and are cemented thereto with a suitable resilient cement. The sleeve is pervious to both water and oil. A gasket 103 is cemented to the ends caps 93 and 95.

After the cement has set the completed element is withdrawn from the mandrel and is ready for use.

The element 91 may be used as a single cartridge or two elements may be combined to form a cartridge as illustrated by the reference numeral 85 in Figure 1. The spacing disc 89 is provided with a center bore 105 which is substantially larger than the bore 107 in the filtering disc 87. The width of the filtering disc 87 is approximately one-half of the spacing disc 89. When the discs are assembled to form a cartridge, the filtering and spacing discs are alternately arranged to form pockets 109 which are sufficiently narrow and deep to stop excessive turbulence and provide an additional filtering surface area. It is to be understood that the spacing disc is also a filtering disc but has been designated as such for clarity of description.

*Operation*

The fuel including contaminants, water and water emulsion is delivered under pressure through the conduit 31 into the chamber 15 whence it flows to the interior of the cartridge 85 through nipples 43 and ports 83. The fuel is distributed into the pockets 109 which have a tendency to slow the turbulence of the fuel thereby creating a favorable condition for coagulation of contaminant and presents a large filtering surface for a thick cake to form thereupon before the pressure differential reaches a critical value. At the beginning of the operation most of the fuel will flow through the spacing discs 89 but they soon become covered with a cake of contaminant and the liquid seeks a way of lower resistance through the whole surface of the filtering discs.

The cartridge performs the dual function of coalescing minute particles of entrained water into markedly larger particles and of removing solids, including particles of micronic size from the liquid. The cotton sock provides secondary coalescence so that the water droplets are increased in diameter.

After passing through the cartridge 85, the liquid flows through the cage 53 to the interior of the screen 55 where the water particles in some instances coalesce into large drops of water and then falls by gravity, downwardly between the cage 53 and screen 55 to the water trap 65. The water from the trap 65 pours in a stream into the bottom of the chamber 17 where it may be removed through the drain 35.

The treated fuel passes out through the screen 55 into the upper portion of the chamber 17 and out the conduit 33.

When the cartridge 85 becomes clogged or ineffective the clamping means 27 is disengaged and the cover 19 is removed, then the nut 77 and rod 75 are removed to release the cartridge which may then be lifted out of the unit and a new one installed in its place. The unit is reassembled in an obvious manner.

It is obvious that various changes may be made in the form, structure and arrangement of parts without departing from the spirit of the invention. Accordingly, applicants do not desire to be limited to the specific embodiment disclosed herein primarily for purposes of illustration; but instead, they desire protection falling fairly within the scope of the appended claim.

We claim:

A water and fuel separating unit comprising, in combination, first and second spaced members, said first member having an opening therein, a perforated cage disposed between said spaced members, a porous cartridge of fiber glass material disposed within the cage for water-oil emulsion breaking, straining means spaced and surrounding the cage for directing the water droplets downwardly, and the improvement comprising a weir mounted on said first member for collecting the water droplets.

References Cited in the file of this patent

UNITED STATES PATENTS

| | | |
|---|---|---|
| 1,535,768 | Davis | Apr. 28, 1925 |
| 1,590,870 | Williams | June 29, 1926 |
| 2,079,910 | Kamrath | May 11, 1937 |
| 2,148,708 | Orr | Feb. 28, 1939 |
| 2,269,725 | Malanowski | Jan. 13, 1942 |
| 2,349,469 | Sloan | May 23, 1944 |
| 2,426,405 | McDermott | Aug. 26, 1947 |
| 2,455,486 | Hicks | Dec. 7, 1948 |
| 2,548,400 | Shepard | Apr. 10, 1951 |
| 2,651,417 | Malanowski | Sept. 8, 1953 |
| 2,657,808 | Mankin | Nov. 3, 1953 |
| 2,692,686 | Fleck | Oct. 26, 1954 |
| 2,707,563 | Kasten | May 3, 1955 |
| 2,725,986 | Marvel | Dec. 6, 1955 |
| 2,748,949 | James | June 5, 1956 |
| 2,800,232 | Marvel | July 23, 1957 |